2,943,661

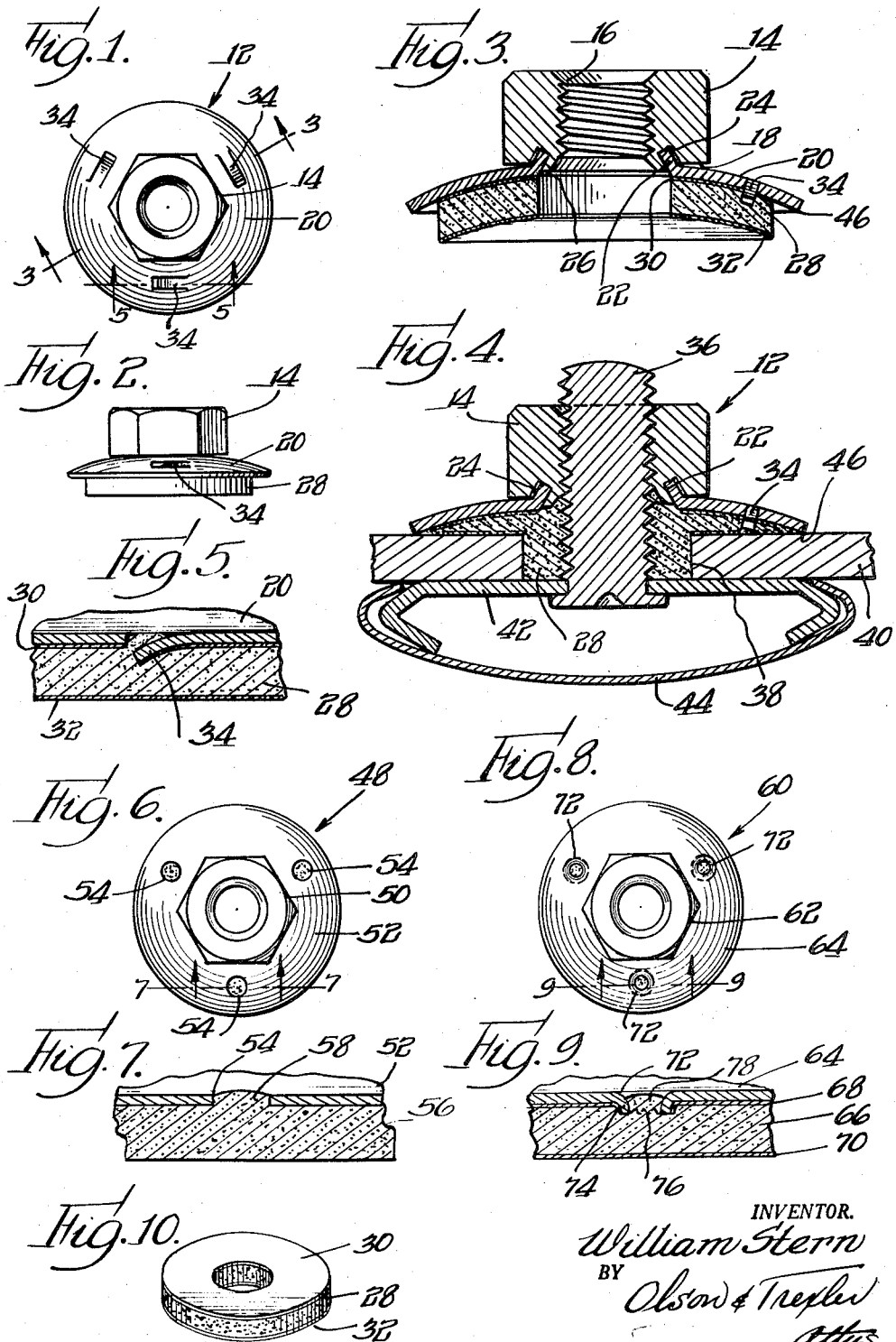

United States Patent Office
Patented July 5, 1960

2,943,661

NUT AND SEALING WASHER ASSEMBLY WITH INCLINED SECURING TONGUES

William Stern, Park Ridge, Ill., assignor to Illinois Tool Works, Chicago, Ill., a corporation of Illinois Filed July 17, 1953, Ser. No. 368,776

1 Claim. (Cl. 151—38)

The present invention relates to a novel preassembled rotary fastening device, and more particularly to a novel assembly including a rotary fastener and sealing means.

In many instances, when using threaded rotary fasteners such as nuts or screws, it is desirable or necessary to seal the aperture in the work piece receiving the screw and/or seal a threaded nut against passage of moisture therethrough. For example, automobile molding strips are often mounted by means of a clip secured to a work piece or panel with a threaded screw or stud and a complementary threaded nut member. It is desirable to prevent moisture from entering within the molding strip through the aperture in the panel receiving the stud, and this has been accomplished in the past by inserting a sealing washer between the nut and the panel or between the panel and a lock washer cooperating with the nut. In the past, such sealing washers have been applied to the screws as separate elements so that the individual handling of the sealing washers has been bothersome and time consuming and, therefore, uneconomical. It is, therefore, an object of the present invention to eliminate the need for individual handling of such sealing washers by providing a novel preassembled rotary fastener unit including such sealing washers.

A more specific object of the present invention is to provide a novel preassembled rotary fastener unit including a sealing washer made of soft and pliable material and wherein the sealing washer is securely retained against inadvertent disassembly prior to an application of the fastener unit to the work.

Still another object of the present invention is to provide a novel rotary fastener unit of the above described type, wherein the sealing washer is secured to the unit in a simple and economical manner.

A further object of the present invention is to provide a novel rotary fastener unit of the above described type, wherein a lock washer is formed for attachment to the sealing washer in a manner so that the lock washer substantially retains its initial holding power.

Other objects and advantages of the present invention will become apparent from the following description and the accompanying drawings, wherein:

Fig. 1 is a plan view illustrating a rotary fastener assembly embodying the principles of this invention;

Fig. 2 is a side elevational view of the rotary fastener assembly or unit shown in Fig. 1;

Fig. 3 is an enlarged vertical cross section taken along line 3—3 in Fig. 1;

Fig. 4 is a cross sectional view similar to Fig. 3, but showing the fastener unit applied to a work piece;

Fig. 5 is an enlarged fragmentary cross sectional view taken along line 5—5 in Fig. 1;

Fig. 6 is a plan view showing a modified form of the present invention;

Fig. 7 is an enlarged fragmentary cross sectional view taken along line 7—7 in Fig. 6;

Fig. 8 is a plan view showing another slightly modified form of the present invention;

Fig. 9 is an enlarged fragmentary cross sectional view taken along line 9—9 in Fig. 8; and Fig. 10 is a perspective view illustrating a sealing washer utilized in the preassembled fastener unit of this invention.

Referring now more specifically to the drawings, wherein like parts are designated by the same numerals throughout the various figures, a preassembled fastening unit 12 embodying one form of the present invention is shown in Figs. 1 through 5. The unit 12 includes a nut 14 having a threaded bore 16 and a clamping surface 18. A dish-shaped spring lock washer 20 is associated with the clamping face of the nut and includes a centrally disposed inner conical portion 22 extending into an annular conical recess 24 in the clamping face of the nut. The nut 16 is provided with a depending skirt 26 which is swaged radially outwardly beneath the conical portion of the lock washer, whereby to retain the lock washer and nut in preassembled relationship. Preferably, the width of the annular recess is sufficient to enable the lock washer to rotate freely with respect to the nut at least during initial stages of application of the fastener unit to the work.

In accordance with a feature of the present invention, the preassembled fastener unit 12 also includes a sealing washer 28. Various waterproof and pliable materials may be used for the sealing washer, and it has been found that a tar-like material or asphalt mixed with a filler, such as asbestos, gives excellent results. Since the washers 28 are initially shipped or stored in bulk containers before assembly with the fastener unit, and since the fastener units are similarly stored or shipped, it is desirable to provide means for preventing adjacent washers from sticking together during such shipping or storing. This is accomplished by applying thin rupturable disks 30 and 32 constructed of paper, fibre, cloth, or other suitable material to opposite sides of the sealing washer body, which disks may be impregnated with oil, if desired.

In order to retain the sealing washer in preassembled relationship with the fastener unit 12, a plurality of small fingers 34 are struck from the dish-shaped body of the lock washer and bent downwardly in the manner indicated best in Fig. 5. The washer 28 is applied to the fastener assembly by pressing the sealing washer axially against the locking washer and rotating these two washers relative to each other so that the fingers 34 pierce the paper covering 30 on the sealing washer and imbed themselves in the sealing washer. It has been found that the adhesive engagement of the washer 28 with the fingers along with the added strength provided by the paper disk 30 effectively secures the sealing washer in preassembled relationship and substantially eliminates any possibility of the sealing washer becoming inadvertently disassembled.

As shown best in Figs. 3 and 4, the dish-shaped locking washer 20 extends radially outwardly from the clamping surface of the nut for a substantial distance, whereby the fastener unit is adapted to be applied to a screw or stud extending through an oversized aperture in a work piece. Such an application of the fastener unit is shown in Fig. 4, where the unit is applied to a stud or screw 36 extending through an oversized aperture 38 in a panel 40. In the structure shown for purposes of illustration, the stud 36 is secured to a clip 42 for retaining a molding strip 44 against the side of the panel. In order to seal the aperture 38 against the passage of moisture therethrough, it is necessary for the sealing washer to engage the periphery of the screw in a secure manner, as well as the portion of the panel surrounding the aperture. This action is assured by the concave shape of the lock washer which causes the pliable sealing washer to flow inwardly into engagement with the screw and partially into the aperture 38 when the sealing washer is compressed between the lock washer and the panel in the manner shown in Fig. 4. In order to prevent any substantial portion of the pliable lock washer from flowing radially outwardly of the lock washer, the sealing washer diameter is preferably somewhat less than the diameter of the lock washer, as shown in Fig. 3. Furthermore, as shown in Fig. 4, the peripheral edge 46 of the lock washer forms a line seal with the panel, thereby substantially eliminating any outward flow of the pliable sealing washer material.

While the fingers 38 are struck from the body of the lock washer, it has been found that the strength and holding power of the lock washer 20 compares favorably with a similar lock washer having no fingers struck therefrom. This result is accomplished by locating the fingers 34 adjacent the outer peripheral margin of the lock washer 20 so that when the washer 20 is flattened during application to the work, as shown in Fig. 4, the fingers 34 provide abutments for engagement with the panel and cooperate with the dish-shaped body portion of the lock washer to resist further flattening thereof.

A slightly modified form of the present invention is shown in Figs. 6 and 7 which illustrate a preassembled fastener unit 48 including a nut 50 and a dish-shaped lock washer 52. The nut 50 and the lock washer 52 are substantially identical to and connected together in the same manner as the above described nut 14 and lock washer 20. However, in this embodiment, the washer 52 is provided with a plurality of small circular apertures 54 instead of the above described fingers 34, and a sealing washer 56 identical to the above described washer 28, except that the paper disks have been eliminated, is applied to the lock washer simply by pressing the sealing washer 56 against the lock washer so that a portion 58 of the pliable washer body is extruded through the apertures 54 in the manner best illustrated in Fig. 7. It has been found that the resistance to inadvertent disassembly of sealing washers applied to the fastener unit in the manner shown in Figs. 6 and 7 compares favorably with the resistance to disassembly of sealing washers applied to the fastener unit in the manner shown in Figs. 1 through 5. While the washer 52 is not quite as strong as the washer 20 because of the removal of material from the washer 52, the ease of application of the washer 56 to the washer 52 compensates for this slight disadvantage, especially since the washer 52 is still strong enough for most uses.

Figs. 8 and 9 show another slightly modified form of the present invention which is similar to the embodiment shown in Figs. 6 and 7, except that it is adapted to utilize a sealing washer having paper disks secured thereto. Thus, Figs. 8 and 9 show a fastener unit 60 which includes a nut 62, a dish-shaped lock washer 64, and a sealing washer 66 having opposite faces thereof covered with paper disks 68 and 70. In this embodiment, a plurality of small apertures 72 are punched or otherwise formed in the body of the washer 64 in a manner to provide annular depending projections 74 for penetrating the paper disks 68 on the sealing washer. Preferably, the annular projections 74 are provided with sharp or rough edges 76 to facilitate penetration of the paper disks. The sealing washer 66 is applied to the lock washer 64 merely by pressing these two washers together so that the annular projections pierce the paper disk 68, and a portion 78 of the pliable sealing washer body is extruded into the opening 72.

From the above description, it is seen that the present invention has provided a novel preassembled rotary fastener unit including a sealing washer, whereby individual handling of the sealing washer is eliminated. Furthermore, it is seen that the present invention has provided a rotary fastener unit wherein the sealing washer is secured to the unit in a simple and economical manner. In addition, it is seen that the present invention has provided a novel preassembled fastener unit, wherein means is provided on a lock washer for attachment of the sealing washer in a manner so that the strength and holding power of the lock washer remains substantially undiminished.

While the preferred embodiments of the present invention have been illustrated and described here, it is obvious that many structural details may be changed without departing from the spirit and scope of the appended claims. For example, while the rotary fastener units shown herein for purpose of illustration include a nut, it is obvious that the principles of the present invention may be applied to fastener units including various screw elements.

The invention is claimed as follows:

A preassembled fastener unit comprising a nut member, a resilient sheet metal washer rotatably coupled to the clamping face of said nut member along its inner margin and being of generally dished configuration, said dished configuration presenting a concave surface facing away from said nut member, said metal washer being provided intermediate its inner and outer margins with a plurality of spaced and substantially circumferentially extending substantially planar elongated fingers sheared from and deflected out of the surface of the washer and being inclined in a direction away from the said nut member and in the tightening direction of the nut member, the free end portions of each of said elongated fingers lying on a line which traverses both the inner and outer margins of the metal washer and falling in the space formed by the concave surface of said washer and a plane passing through its outer margin, the side margins of said fingers being circumferentially disposed, and a discrete sealing washer element of flowable material of greater thickness than the axial depth of the concave washer mounted on the concave side of said washer by embedment of the said inclined substantially planar finger portions in said sealing washer element intermediate upper and lower surfaces of said sealing washer element as incident to rotation of said sealing washer element relative to said metal washer.

References Cited in the file of this patent

UNITED STATES PATENTS

| | | |
|---|---|---|
| 1,035,190 | Hill | Aug. 13, 1912 |
| 1,186,344 | Silvernail | June 6, 1916 |
| 1,356,873 | Monteath | Oct. 26, 1920 |
| 1,393,459 | Smith | Oct. 11, 1921 |
| 1,516,197 | Lynch et al. | Nov. 18, 1924 |
| 1,814,502 | Barwood | July 14, 1931 |
| 1,917,214 | Bailey | July 11, 1933 |
| 2,020,767 | Bullis et al. | Nov. 12, 1935 |
| 2,029,302 | Balfe | Feb. 4, 1936 |
| 2,079,729 | Balfe | May 11, 1936 |
| 2,576,906 | Poupitch | Nov. 27, 1951 |
| 2,718,691 | Sussenbach | Sept. 27, 1955 |
| 2,761,349 | Heller | Sept. 4, 1956 |

FOREIGN PATENTS

| | | |
|---|---|---|
| 310,685 | Great Britain | May 2, 1929 |